(12) United States Patent
Jamjoom et al.

(10) Patent No.: US 8,423,646 B2
(45) Date of Patent: Apr. 16, 2013

(54) NETWORK-AWARE VIRTUAL MACHINE MIGRATION IN DATACENTERS

(75) Inventors: Hani Jamjoom, White Plains, NY (US); Kang-Won Lee, Nanuet, NY (US); Vlivek V. Shrivastava, Madison, WI (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/833,601

(22) Filed: Jul. 9, 2010

(65) Prior Publication Data

US 2012/0011254 A1    Jan. 12, 2012

(51) Int. Cl.
*G06F 15/173*    (2006.01)

(52) U.S. Cl.
USPC ........... 709/226; 709/203; 709/218; 709/223; 709/224

(58) Field of Classification Search .................. 709/203, 709/218, 223, 224, 226
See application file for complete search history.

(56) References Cited

U.S. PATENT DOCUMENTS

| | | | | |
|---|---|---|---|---|
| 8,160,063 B2* | 4/2012 | Maltz et al. | ..................... | 370/389 |
| 2005/0125537 A1 | 6/2005 | Martins et al. | | |
| 2006/0230407 A1 | 10/2006 | Rosu et al. | | |
| 2008/0163194 A1 | 7/2008 | Dias et al. | | |
| 2008/0184229 A1 | 7/2008 | Rosu et al. | | |
| 2009/0119396 A1 | 5/2009 | Kanda | | |
| 2009/0172666 A1 | 7/2009 | Yahalom et al. | | |
| 2009/0187713 A1 | 7/2009 | Zedlewski et al. | | |
| 2009/0204718 A1 | 8/2009 | Lawton et al. | | |
| 2009/0210527 A1 | 8/2009 | Kawato | | |
| 2009/0276771 A1 | 11/2009 | Nickolov et al. | | |
| 2009/0303880 A1* | 12/2009 | Maltz et al. | ..................... | 370/235 |
| 2009/0307334 A1* | 12/2009 | Maltz et al. | ..................... | 709/219 |
| 2011/0145380 A1* | 6/2011 | Glikson et al. | ................. | 709/223 |
| 2011/0153724 A1* | 6/2011 | Raja et al. | ....................... | 709/203 |

OTHER PUBLICATIONS

Wood, T., et al., "Black-Box and Gray-Box Strategies for Virtual Machine Migration," NSDI: 4th USENIX Symposium on Networked Systems Design & Implementation, pp. 229-242, 2007.

* cited by examiner

*Primary Examiner* — Liangche A Wang
(74) *Attorney, Agent, or Firm* — Jose Gutman; Fleit Gibbons Gutman Bongini & Bianco PL

(57) ABSTRACT

A method, information processing system, and computer program product manage virtual machine migration. A virtual machine is selected from a set of virtual machines. Each physical machine in a plurality of physical machines is analyzed with respect to a first set of migration constraints associated with the virtual machine that has been selected. A set of physical machines in the plurality of physical machines that satisfy the first set of migration constraints is identified. A migration impact factor is determined for each physical machine in the set of physical machines that has been identified based on a second set of migration constraints associated with the virtual machine that has been selected. A physical machine is selected from the set of physical machines with at least a lowest migration impact factor on which to migrate the virtual machine that has been selected in response to determining the migration impact factor.

20 Claims, 3 Drawing Sheets

NETWORK-AWARE VIRTUAL MACHINE MIGRATION IN DATACENTERS

FIELD OF THE INVENTION

The present invention generally relates to the field of information processing systems, and more particularly relates to managing the placement of virtual machines on a network.

BACKGROUND OF THE INVENTION

In modern data centers, strategies for placing guest servers (e.g., virtual machines) on host servers (e.g., hypervisors) take into consideration performance metrics related to CPU utilization, memory usage, I/O usage, etc. However, such placement strategies can lead to sub-optimal network performance. For example, it is possible that two guest servers that exchange large quantities of traffic between each other will be placed on the network in such a way that their traffic has to traverse through multiple switches. This results in bandwidth waste at the aggregate or core switches and increased traffic latency.

SUMMARY OF THE INVENTION

In one embodiment, a method for managing virtual machine migration is disclosed. The method comprises selecting a virtual machine from a set of virtual machines. Each physical machine in a plurality of physical machines is analyzed with respect to a first set of migration constraints associated with the virtual machine that has been selected. A set of physical machines in the plurality of physical machines that satisfy the first set of migration constraints is identified. A migration impact factor is determined for each physical machine in the set of physical machines based on a second set of migration constraints associated with the virtual machine that has been selected. A physical machine is selected from the set of physical machines with at least a lowest migration impact factor on which to migrate the virtual machine that has been selected in response to determining the migration impact factor.

In another embodiment, an information processing system for managing virtual machine migration is disclosed. The information processing system comprises a memory and a processor communicatively coupled to the memory. The information processing system further comprises a virtual migration manager communicatively coupled to the memory and the processor. The virtual machine migration manager is configured to select a virtual machine from a set of virtual machines. Each physical machine in a plurality of physical machines is analyzed with respect to a first set of migration constraints associated with the virtual machine that has been selected. A set of physical machines in the plurality of physical machines that satisfy the first set of migration constraints is identified. A migration impact factor is determined for each physical machine in the set of physical machines based on a second set of migration constraints associated with the virtual machine that has been selected. A physical machine is selected from the set of physical machines with at least a lowest migration impact factor on which to migrate the virtual machine that has been selected in response to determining the migration impact factor.

In yet another embodiment, a computer program product for managing virtual machine migration is disclosed. The computer program product comprises a storage medium readable by a processing circuit and storing instructions for execution by the processing circuit for performing a method comprising selecting a virtual machine from a set of virtual machines. Each physical machine in a plurality of physical machines is analyzed with respect to a first set of migration constraints associated with the virtual machine that has been selected. A set of physical machines in the plurality of physical machines that satisfy the first set of migration constraints is identified. A migration impact factor is determined for each physical machine in the set of physical machines based on a second set of migration constraints associated with the virtual machine that has been selected. A physical machine is selected from the set of physical machines with at least a lowest migration impact factor on which to migrate the virtual machine that has been selected in response to determining the migration impact factor.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
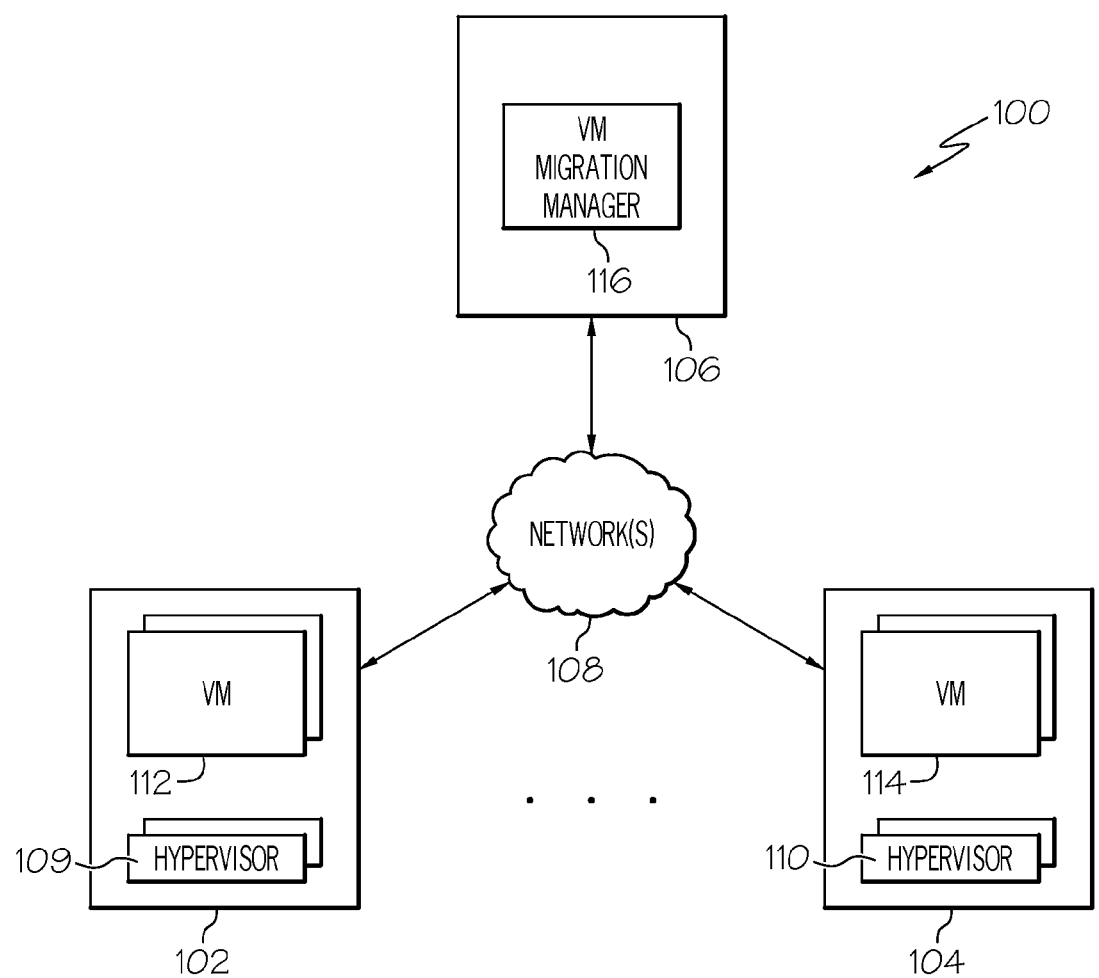
FIG. 1 is a block diagram illustrating an exemplary computing environment according to one embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

VM migration is a method and accompanying technology used in virtualized data centers to flexibly allocate or (re-)allocate physical resources such as processing and memory capacity, as application demand changes and physical machines that host multiple virtual machines become overloaded. The process of migrating virtual machine images involves, among other things, the main steps of discovering available resources on the physical machines, deciding on which virtual machines to migrate and where, as well as performing the actual movement of the image from one physical machine to another, by transferring the VM image over the network, including its static as well as the live (run-time) state.

Current solutions for VM migration generally do not take into account the topology of the network infrastructure of a data center in conjunction with the interdependencies of the components of a multi-tier enterprise application. These solutions typically optimize the migration and placement of VMs based on processing and memory load of the physical machines onto which the VMs will be running. As a result they are indifferent to network over-utilization that might come as a result of migration.

Therefore, one or more embodiments of the present invention, as will be discussed in greater detail below, take into account network topology and application dependencies to provide a more comprehensive approach to VM migration that spans along the communications dimension as well, in addition to the constraints related only to local resources at physical machines. Various embodiments solve the problem of migrating virtual machines in data centers in a way that minimizes the overall network traffic that is transported through the network infrastructure of the data center with the new placement of the VM images (after migration), thus improving the utilization of the network infrastructure. In addition, these embodiments minimize the communication delays among components of multi-tier enterprise applications that are hosted on multiple virtual machines as they are migrated amongst the physical machines of a data center. This leads to lower overall response times for the enterprise applications. It should be also noted that the techniques described herein can also be applied to embodiments where virtual machines are migrated amongst physical machines that might reside in disparate datacenters; minimizing communication traffic and delays among the components of multi-tier applications hosted on multiple virtual machines decreases communication costs among the datacenters and improves response times of the multi-tier applications.

Operating Environment

FIG. 1 shows an example of an operating environment applicable to various embodiments of the present invention. In particular, FIG. 1 is an operating environment applicable to virtual machine (VM) migration. FIG. 1 shows an operating environment 100 comprising a plurality of processing nodes such as information processing systems 102, 104, 106. Each of the plurality processing nodes 102, 104, 106 are communicatively coupled to a network 108 such as, but not limited to, a data center network. The data center network 108 can comprise, but is not limited to, a three-tier architecture. In one embodiment, one or more processing nodes 102, 104 comprise one or more hypervisors 109, 110. Each of these processing nodes 102, 104 can also comprise one or more virtual machines (VMs) 112, 114. One or more of the other information processing systems 106 comprise a VM migration manager 116 that manages the migration of the VMs 112, 114. However, it should be noted that any of the processing nodes 102, 104, 106 can comprise a VM migration manager 116. The VM migration manager 116 is discussed in greater detail below.

Processing Node

Figure 2:
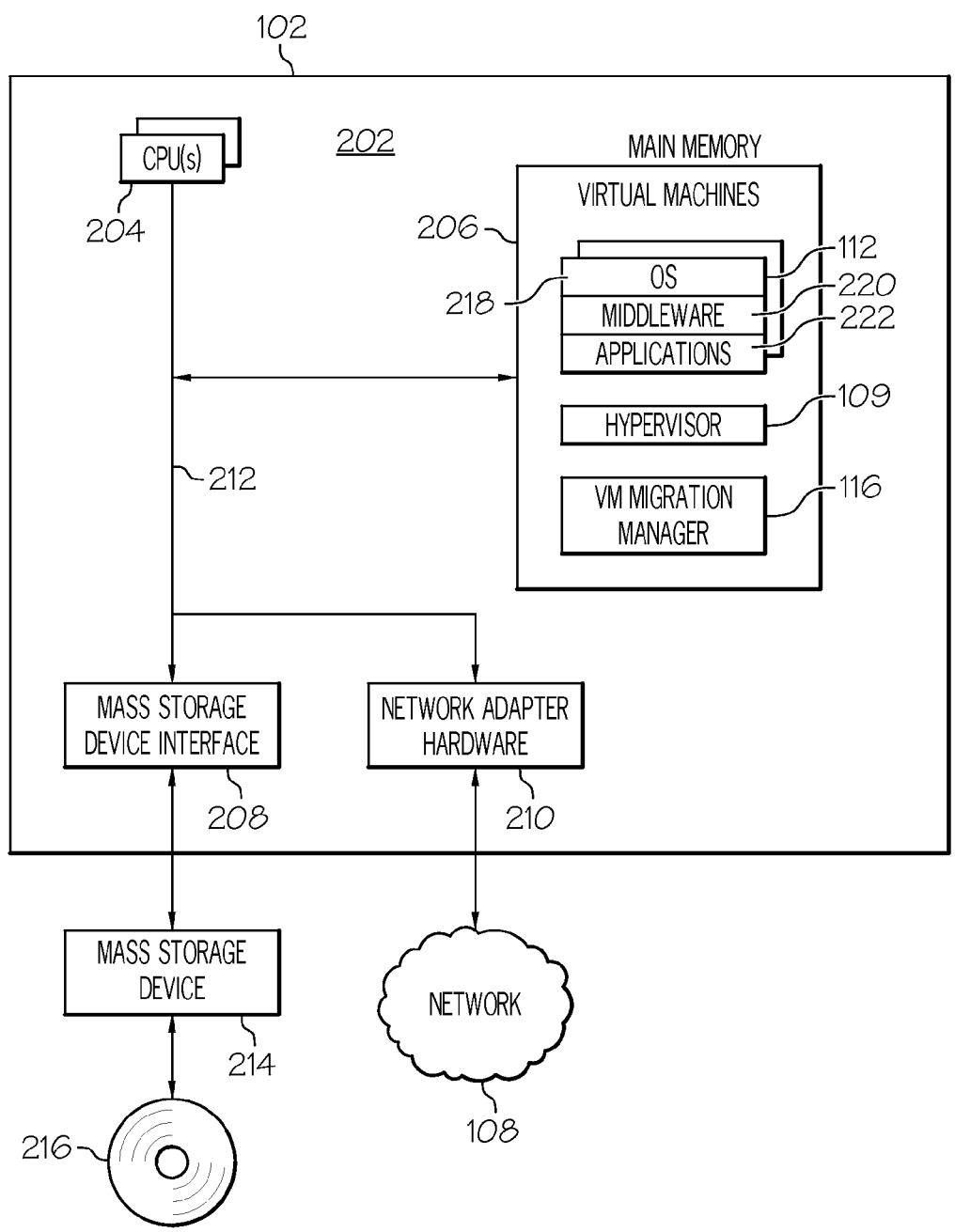
FIG. 2 is a detailed view of an information processing system according to one embodiment of the present invention.

FIG. 2 is a block diagram illustrating a detailed view of a processing node. In this embodiment, the processing node illustrated in FIG. 2 is the information processing system 102 of FIG. 1. However, the processing node of FIG. 2 can be any of the processing nodes in FIG. 1. Any suitably configured processing system is similarly able to be used as the information processing system 102 in further embodiments of the present invention (for example, a personal computer, workstation, or the like). The information processing system 102 includes a computer 202. The computer 202 has a processor(s) 204 that is connected to a main memory 206, mass storage interface 208, and network adapter hardware 210. A system bus 212 interconnects these system components. The mass storage interface 208 is used to connect mass storage devices, such as data storage device 214, to the information processing system 102. One specific type of data storage device is an optical drive such as a CD/DVD drive, which may be used to store data to and read data from a computer readable medium or storage product such as (but not limited to) a CD/DVD 216. Another type of data storage device is a data storage device configured to support, for example, NTFS type file system operations.

Although only one CPU 204 is illustrated for computer 202, computer systems with multiple CPUs can be used equally effectively. Various embodiments of the present invention are able to use any other suitable operating systems as well. The network adapter hardware 210 is used to provide an interface to one or more networks 106. Various embodiments of the present invention are able to be adapted to work with any data communications connections including present day analog and/or digital techniques or via a future networking mechanism. Although one or more embodiments of the present invention are discussed in the context of a fully functional computer system, those skilled in the art will appreciate that embodiments are capable of being distributed as a program product via CD or DVD, e.g., CD 216, CD ROM, or other form of recordable media, or via any type of electronic transmission mechanism.

The main memory 206, in one embodiment, comprises one or more virtual machines 112, 114. A virtual machine, in this embodiment, is a discrete execution environment within a single computer to make the computer function as if it were two or more independent computers. Each virtual machine 112, 114 is assigned all the resources it needs to operate as though it were an independent computer, including processor time, memory, an operating system, and the like. Each virtual machine 112, 114 comprises an operating system 218, middleware 220, applications 222, and the like. Each virtual machine 112, 114 can support specific guest operating systems and multiple user sessions for executing software written to target the guest operating systems. For example, one virtual machine may support an instance of the Linux® operating system, while a second virtual machine executes an instance of the z/OS® operating system. Other guest operating systems can also be supported as well.

The operating system 218 is a layer of system software that schedules threads and provides functions for making system resources available to threads, including memory access, access to input/output resources, and the like. The operating system also controls allocation and authorization for access to computer resources. The operating system performs low-level basic tasks such as recognizing input from a keyboard, sending output to a display screen, keeping track of files and directories on a magnetic disk drive, and controlling peripheral devices such as disk drives and printers.

The operating system is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX™, Linux™, Microsoft NT™, AIX™, IBM's i5os, and many others. The middleware 220 is software that connects multiple software applications for exchanging data. Middleware can include application servers, content management systems, web servers, and the like. Applications 222 are any software programs running on top of the middleware 220.

The main memory 206 also includes a hypervisor 109. The hypervisor 109 is a layer of system software that runs under the operating system and the virtual machines 108. That is, a hypervisor 109 runs between an operating system 218 and underlying physical computer components including physical processors 204. It is the function of the hypervisor 109, among other things, to manage virtual machines 108 and multiplex the use of the underlying physical resources such as processor, memory, and network across a plurality of virtual machines. Although only one hypervisor 109 is shown, each virtual machine 108 can include its own hypervisor 109.

The main memory 206, in one embodiment, also comprises the VM migration manager 116. The VM migration manager 116, which is discussed in greater detail below, manages the migration of VMs, in one embodiment, by utilizing application configuration information (i.e., which VM talks to which other VMs) and measurements on the communication patterns among VMs in conjunction with the network topology of the communication infrastructure of the data center 106. The VM migration manager 116 uses this information to determine which virtual machines (and in what order) to migrate; the choice of physical machines onto which the virtual machines are to be mapped; as well as the appropriate time when migration is to take place.

One advantage of various embodiments of the present invention is that they localize network communication among VMs that exhibit strong communication patterns, as the VM migration manager 116 attempts to place them to physical machines that are in close proximity to each other. This reduces the traffic that needs to be transported over multiple hops in a data center, thus freeing up network resources such as precious uplink capacity of the switches. Second, by placing closely (in the topological sense of the physical machines that they run on) VMs that communicate frequently with one another, end-to-end communication delay of a multi-tier application is minimized, as less hops need to be traversed in the network topology of the data center (and hence less forwarding delays, congestion, etc. is introduced to the data center network).

Although illustrated as concurrently resident in the main memory 106, it is clear that respective components of the main memory 106 are not required to be completely resident in the main memory 106 at all times or even at the same time. It should be noted that although t the VM migration manager 116 is shown residing outside of the hypervisor 224 the VM migration manager 116 can reside within the hypervisor 224 as well. It also should be noted, as discussed above, that the VM migration manager 116 can reside on a remote information processing system(s) 106 as well.

Virtual Machine Migration

Modern data centers provide a virtual computing environment for customers to run applications or services, with computing resources being allocated with the use of virtual machines (VMs). As will be discussed in greater detail below, one or more embodiments of the present invention take into account network topology and application dependencies in addition to server constraints (e.g., CPU and memory resources) to provide a more comprehensive approach to VM migration.

Initially, the VM migration manager 116 identifies the VMs 110, 112 in the datacenter 106. The VMs can be represented as $V=\{V_1, V_2, V_3, \ldots, V_n\}$, where V is the plurality of VMs in the data center 108. The VM migration manager 116 then identifies the physical machines 102, 104, 106, in the data center 108. The plurality of physical machines 102, 104, 106 is represented as $P=\{P_1, P_2, P_3, \ldots, P_n\}$. The VM migration manager 116 analyzes the VMs in V and identifies a set of overloaded VMs, which are the VMs that are to be migrated. This set of overloaded VMs is defined as O such that O is a subset of V.

In one embodiment, the VM migration manager 116 obtains a dependency graph. This dependency graph can either be generated by the VM migration manager 116 or a datacenter manager (not shown). The dependency graph represents the dependencies between VMs in the set of VMs V. The dependency graph is defined as $G=(V, E)$, where V is the set of virtual machines and E is the set of locality edges defined as $E=(V_i, V_j)|V_i, V_j$ in V, such that $V_i$ and $V_j$ are dependent on each other. A weight is defined for each edge $W(V_i, V_j)$, which is directly proportional to the degree of dependency between the $V_i$, $V_j$. Next, Load($V_i$) is defined as the load vector on the virtual machine $V_i$. Further, Capacity ($P_i$) is defined as the available capacity on physical machine $P_i$. In one embodiment, "capacity" is the amount of available resource of a physical machine. Examples of capacity include but are not limited to the amount of physical memory that is not consumed by any application or virtual machine, the communication bandwidth of a network link that can be used for transmission, or the even the gap between the current utilization level of a processor and its maximum. Capacity can be represented by an instantaneous measure of the availability of a resource, an average value over some history, an estimate based on sample values, or a forecast.

The VM migration manager 116 determines the cost of migrating virtual machines $V_i$, $V_j$ to physical machines $P_k$, $P_l$. One example of capturing cost is to consider physical network distance and dependency between VMs by defining the cost as $Cost(V_i, P_k, V_j, P_l)=Distance(P_k, P_l) \times W(V_i, V_j)$. Here, Distance($P_k$, $P_l$) can be defined as the latency, delay, or hops between physical machines $P_k$, $P_l$ or any other suitable metric that can denote topological proximity in some metric space. Finally, $X_{ik}$ is defined as $X_{ik}=1$ if $V_i$ is assigned to $P_k$, 0 otherwise. Hence, $X_{ik}$ is 1, if virtual machine $V_i$ is placed on physical machine $P_k$. Similarly, $X_{(jl)(ik)}$ is defined as $X_{(jl)(ik)}=1$ if $V_i$, $V_j$ are assigned to ($P_k$, $P_l$), 0 otherwise. Again, $X_{(jl)(ik)}$ is 1, if virtual machine $V_i$, $V_j$ is located on physical machine $P_k$, $P_l$ respectively.

In one embodiment the optimization framework utilized by the VM migration manager 116 is defined as follows.

minimize (SUM(Cost($V_i,P_k,V_j,P_l$)×$X_{(jl)(ik)}$, over all $A$,
where $A$ is defined as, $A=\{(i,j,k,l)|i<j$ and $k<l$
and $j<|V|$ and $1<|P|\}$. (1)

The above equation is directed to minimizing the overhead of virtual machine migration, which tries to place the dependent virtual machines close to each other in the data center topology.

Additionally, the following constraints are to be satisfied.

$$\text{SUM}(X_{ik}), \text{ for } 0<k<|P|=1, \text{ for every } i \text{ such that } V_i \text{ belongs to } O \quad (2)$$

This equation dictates that each overloaded virtual machine $V_i$ is to be placed on at least one physical machine $P_k$.

$$X_{ik}+X_{jl}\leq 1+X_{(jl)(ik)}, \text{ for every } (i,j,k,l), V_i, V_j \text{ belongs to } O, P_k, P_l \text{ belongs to } P \quad (3)$$

The above equation is used as a check to force the variable $X_{(jl)(ik)}$ to take a value of 1 when both virtual machine $V_i$, $V_j$ are placed on physical machines $P_k$, $P_l$.

$$X_{(jl)(ik)}, X_{ik} \text{ belongs to } \{0,1\} \quad (4)$$

This equation forces the indicator variables to take binary values. This is important as virtual machine migration is itself binary in nature, meaning that any given virtual machine can only reside on one physical machine at a time.

$$\text{SUM}(\text{Load}_i \times X_{ik}), \text{ for } 0<i<|V|<=\text{Capacity}_k, \text{ for every } k \text{ such that } P_k \text{ belongs to } P \quad (5)$$

This equation ensures that the total load on any physical machine is greater than or equal to its capacity.

$$X_{ik} = \text{Fixed, for every } i \text{ such that } V_i \text{ belong to } V-O \quad (6)$$

Finally, this equation states that the virtual machine to physical machine assignment is already fixed for those virtual machines which are not overloaded. Removing this constraint reduces this optimization problem into an initial virtual machine placement problem.

The problem, as formulated above, is an n-dimensional knapsack problem, which can be very difficult and even impossible to solve for large data centers. However, various embodiments of the present invention overcome this difficulty as is shown below in more detail with respect to FIG. 3. For example, the VM migration manager 116 assigns the VMs to a physical machine one at a time, thereby ensuring that the overall cost of the mapping is minimized at each step. One or more embodiments utilize different heuristic algorithms that differ with each other in the way the overhead introduced by migration is calculated.

Figure 3:
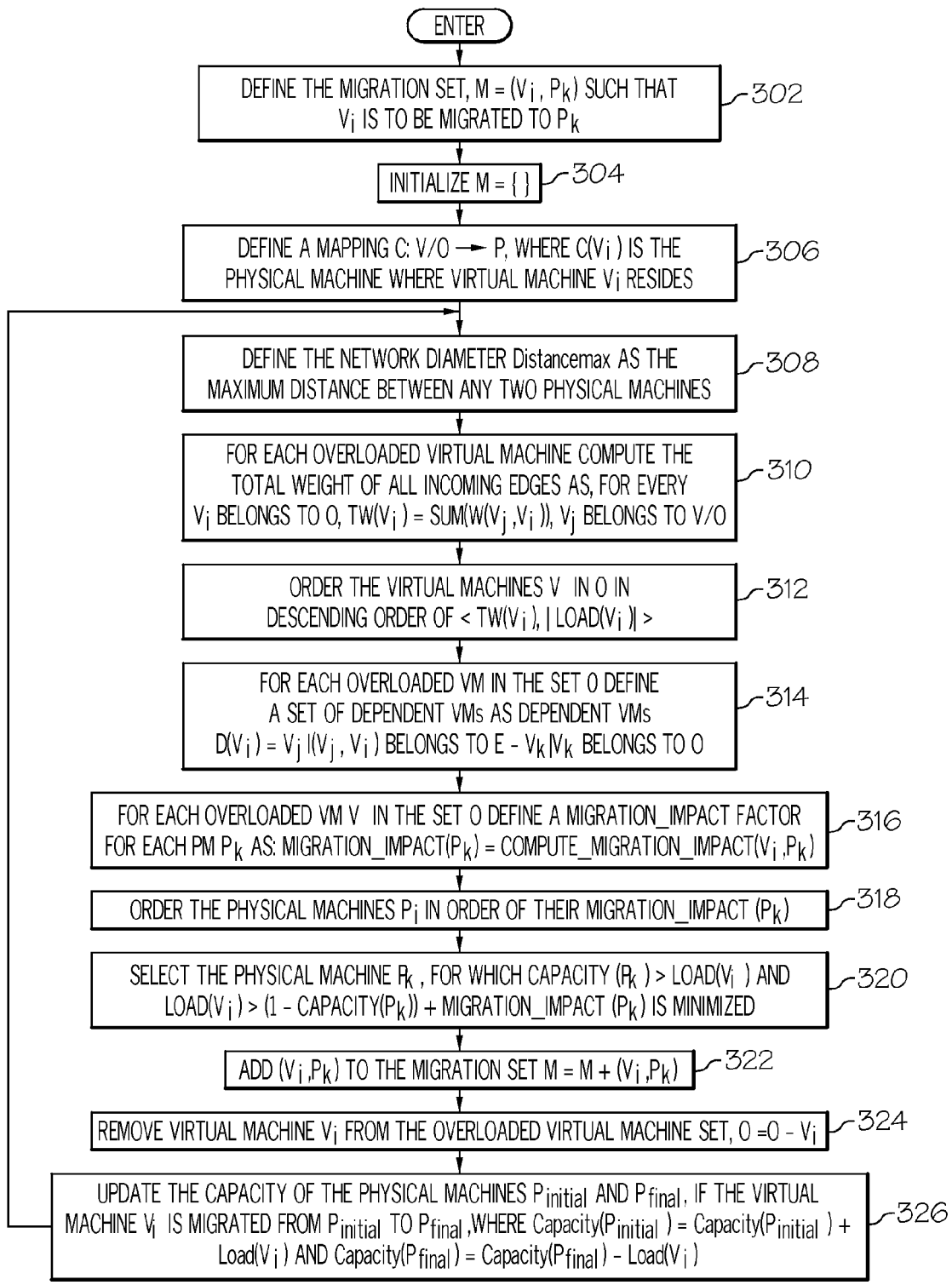
FIG. 3 is an operational flow diagram illustrating one process of managing virtual machine migration based on server and network constraints according to one embodiment of the present invention.

FIG. 3 is an operational flow diagram illustrating one example of network-aware virtual machine migration. In particular, with a dependency graph G, as discussed above, the VM migration manager 116, at step 302, defines the migration set, $M=(V_i, P_k)$ such that $V_i$ is to be migrated to $P_k$. The VM migration manager 116, at step 304, then initializes M={ }. The VM migration manager 116, at step 306, defines a mapping C: V/O→P, where $C(V_i)$ is the physical machine where virtual machine $V_i$ resides. The VM migration manager 116, at step 308, then defines the network diameter Distance$_{max}$ as the maximum distance between any two physical machines in the datacenter. This is also referred as network diameter.

For each overloaded virtual machine, the VM migration manager 116, at step 310, computes the total weight of all incoming edges as, for every $V_i$ belongs to O, $TW(V_i)=\text{SUM}(W(V_j, V_i))$, $V_j$ belongs to V/O. The VM migration manager 116, at step 312, then orders the virtual machines $V_i$ in O in descending order of $<TW(V_i), |\text{Load}(V_i)|>$, i.e. in decreasing order of the total incoming communication traffic. For each overloaded VM in the set O, the VM migration manager 116, at step 314, defines a set of dependent VMs as Dependent VMs, $D(V_i)=V_j|(V_j, V_i)$ belongs to E-$V_k|V_k$ belongs to O.

For each overloaded VM $V_i$ in O, the VM migration manager 116, at step 316, defines a Migration_Impact factor for each PM $P_k$ as: Migration_Impact($P_k$)=compute_migration_impact($V_i, P_k$). In this equation, the migration_impact factor signifies the overall impact of moving virtual machine $V_i$ to physical machine $P_k$. In other words, the VM migration manager 116 calculates the impact that migration of VM $V_i$ would have if it were placed on the physical machine $P_k$. When determining this migration impact the VM migration manager 116 takes into account the two following factors in choosing the physical machine $P_k$: (1) the VM migration manager 116 tries to select the physical machine for which the VM to be migrated will be closer to its dependencies and (2) the VM migration manager 116 tries to select the physical machine that is closer (in the topological sense) to other physical machines that are not overloaded (or lightly loaded). In short form, the Migration_Impact is calculated as:

$$\text{Migration\_Impact}(V_i, P_k) = \frac{\sum_{\forall V_j \in Dep(V_i)} \lfloor \text{Distance}(P_k, P_{V_j}) * \text{Weight}(V_i, V_j) \rfloor}{\text{Distance}_{max} * \text{Weight}_{max}} + \frac{\sum_{\forall P_l \in P} \text{Distance}(P_k, P_l) * |\text{Load}(P_l)|}{\text{Distance}_{Max} * |P|}$$

where Dep($V_i$) are the communication dependencies of VM $V_i$ and P_{V_{j}} is the current physical machine where the VM $V_j$ is placed. Although not shown above, it is to be understood that these terms might be weighted, so as to denote a relative importance (or preference) of one over the other. It is also to be understood that the above method of calculating migration impact is only one example, and other embodiments use the dependency information, distance information, and load information for VMs and PMs to calculate migration impact in a number of different ways.

Once the migration impact is calculated, the VM migration manager 116, at step 318, then orders the physical machines $P_i$ in order of their Migration_Impact($P_k$). The VM migration manager 116, at step 320, selects the physical machine $P_k$, for which Capacity($P_k$)>Load($V_i$) and Load($V_i$)>(1_Capacity($P_k$))+Migration_Impact($P_k$) is minimized. This ensures a best-fit approach where the VM migration manager 116 is placing the virtual machine on a physical machine that minimizes overall utilization of the physical machine $P_k$.

The VM migration manager 116, at step 322, then adds ($V_i$, $P_k$) to the migration set M=M+($V_i$, $P_k$). The VM migration manager 116, at step 324, removes virtual machine $V_i$ from the overloaded virtual machine set, O=O-$V_i$. The VM migration manager 116, at step 326, then updates the capacity of the physical machines, $P_{initial}$ and $P_{final}$, if the virtual machine $V_i$ is migrated from $P_{initial}$ to $P_{final}$, where Capacity($P_{initial}$)=Capacity($P_{initial}$)+Load($V_i$) and Capacity($P_{final}$)=Capacity($P_{final}$)-Load($V_i$). The operational flow then returns to step 328 where the VM migration manager 116 repeats steps 308 to 318 until all overloaded virtual machines are migrated to less loaded physical machines (i.e., O=empty set).

Two further improvements can be made to the framework above. The first improvement is that the VM migration manager 116 can run multiple iterations of the algorithm and the iteration that produces the mapping with the minimum total migration cost for all overloaded VMs is chosen. The second improvement is for every iteration of the above algorithm and for any given candidate destination physical machine as it is chosen in step 316, the migration impact comprises the cost of future mappings of all other VMs (so that future mapping cost is taken into account).

As can be seen from the above discussion, the VM migration manager 116 performs a VM placement operation that implements a dual loop. The VM migration manager 116 analyzes each overloaded VM and for a current overloaded VM under consideration identifies a most suitable physical machine onto which this current overloaded VM can be migrated. The outer loop of this operation operates over the set of overloaded VMs. For each one of these overloaded VMs the inner loop of the placement operation analyzes each physical machine in the set of physical machines to identify the most suitable physical machine for the current overloaded VM under consideration.

The VM migration manager 116, for each different physical machine, determines whether or not the current physical machine under consideration satisfies server constraints including but not limited to available capacity, software licensing, security zoning, collocation and pinning constraints, while at the same time comprising a minimum migration impact. Furthermore, a combination function of the server constraints might be considered, such as a weighted sum of the server constraints. If the current physical machine under consideration fails to satisfy the server constraints it is removed from consideration. If the current physical machine does satisfy the server constraints then the VM migration manager 116 analyzes the candidate configuration that assumes this physical machine as a potential destination for migration, to determine the migration impact that might be incurred if this physical machine is selected as destination for migration. it satisfies the network constraints.

When trying to identify the most suitable physical machine for an overloaded VM under consideration, the VM migration manager 116 takes into consideration VM dependencies such as the VM under consideration is migrated to a physical machine that allows for dependent VMs to be migrated to the same physical machine or to one or more a physical machines that are machines in close proximity to the current VM's selected physical machine. Therefore, the VM migration manager 116 also considers the network topology of the data center. This allows the VM migration manager 116 to identify physical machines that are in close proximity to each other for the subsequent placement of other overloaded VMs that are dependent on the current overloaded VM currently under consideration.

As a result of these processes and the other processes discussed above a more comprehensive approach to VM migration is provided that spans along the communications dimension, in addition to the constraints related only to local resources. Various embodiments of the present invention minimize the overall network traffic that is transported through the network infrastructure of the data center with the new placement of the VM images (after migration), thus improving the utilization of the network infrastructure. In addition, the communication delays among components of multi-tier enterprise applications that are hosted on multiple virtual machines are minimized as they are migrated amongst the physical machines of a data center. This leads to lower overall response times for the enterprise applications.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of managing virtual machine migration, the method comprising:
    selecting a virtual machine from a set of virtual machines;
    analyzing each physical machine in a plurality of physical machines with respect to a first set of migration constraints associated with the virtual machine that has been selected;
    identifying a set of physical machines in the plurality of physical machines that satisfy the first set of migration constraints;
    determining a migration impact factor for each physical machine in the set of physical machines that has been identified based on a second set of migration constraints associated with the virtual machine that has been selected; and
    selecting, in response to determining the migration impact factor, a physical machine from the set of physical machines with at least a lowest migration impact factor on which to migrate the virtual machine that has been selected.

2. The method of claim 1, wherein the first set of migration constraints are server constraints, and wherein the second set of migration constraints are network constraints.

3. The method of claim 1, wherein selecting the virtual machine further comprises:
identifying a plurality of overloaded virtual machines in a network;
determining, for each overloaded virtual machine in the plurality of overloaded virtual machines, a total amount of incoming communication traffic; and
selecting an overloaded virtual machine in the plurality of overloaded virtual machines that comprises a highest total amount of incoming communication traffic.

4. The method of claim 3, wherein selecting the overloaded virtual machine further comprises:
sorting the plurality of overloaded virtual machines in descending order of their total amount of incoming communication traffic; and
selecting, based on the sorting, the overloaded virtual machine that comprises a highest total amount of incoming communication traffic.

5. The method of claim 1, wherein the identifying a set of physical machines further comprises:
identifying, based on the first set of migration constraints, a set of physical machines that comprises a number of available physical machine resources that satisfy the first set of migration constraints.

6. The method of claim 1, wherein determining a migration impact factor further comprises:
determining a total amount of incoming communication traffic between the virtual machine that has been selected and a set of dependent virtual machines associated with the virtual machine; and
determining a distance between each physical machine and each remaining physical machine in the set of physical machines.

7. The method of claim 6, wherein selecting a physical machine from the set of physical machines with at least a lowest migration impact factor further comprises:
selecting, based on determining the total amount of incoming communication traffic between the virtual machine that has been selected and the set of dependent virtual machines, the physical machine, wherein the physical machine that has been selected is a closest physical machine to a set of physical machines on which to migrate the set of dependent virtual machines.

8. The method of claim 6, wherein selecting a physical machine from the set of physical machines with at least a lowest migration impact factor further comprises:
selecting, based on determining a distance between each physical machine and each remaining physical machine in the set of physical machines, the physical machine, wherein the physical machine that has been selected is a closest physical machine to a set of physical machines that satisfy the first set of migration constraints.

9. An information processing system for managing virtual machine migration, the information processing system comprising:
a memory;
a processor communicatively coupled to the memory; and
a virtual machine migration manager communicatively coupled to the memory and the processor, the virtual machine migration manager configured to:
select a virtual machine from a set of virtual machines;
analyze each physical machine in a plurality of physical machines with respect to a first set of migration constraints associated with the virtual machine that has been selected;
identify a set of physical machines in the plurality of physical machines that satisfy the first set of migration constraints;
determine a migration impact factor for each physical machine in the set of physical machines that has been identified based on a second set of migration constraints associated with the virtual machine that has been selected; and
select, in response to the migration impact factor that has been determined, a physical machine from the set of physical machines with at least a lowest migration impact factor on which to migrate the virtual machine that has been selected.

10. The information processing system of claim 9, wherein the first set of migration constraints are server constraints, and wherein the second set of migration constraints are network constraints.

11. The information processing system of claim 9, wherein virtual machine migration manager is further configured to select the virtual machine by:
identifying a plurality of overloaded virtual machines in a network;
determining, for each overloaded virtual machine in the plurality of overloaded virtual machines, a total amount of incoming communication traffic; and
selecting an overloaded virtual machine in the plurality of overloaded virtual machines that comprises a highest total amount of incoming communication traffic.

12. The information processing system of claim 9, wherein the virtual machine migration manager is further configured to:
determine a migration impact factor by:
determining a total amount of incoming communication traffic between the virtual machine that has been selected and a set of dependent virtual machines associated with the virtual machine; and
determining a distance between each physical machine and each remaining physical machine in the set of physical machines; and
select a physical machine from the set of physical machines with at least a lowest migration impact factor by:
selecting, based on determining the total amount of incoming communication traffic between the virtual machine that has been selected and the set of dependent virtual machines, the physical machine, wherein the physical machine that has been selected is a closest physical machine to a set of physical machines on which to migrate the set of dependent virtual machines.

13. The information processing system of claim 12, wherein the virtual machine migration manager is further configured to select a physical machine from the set of physical machines with at least a lowest migration impact factor by:
selecting, based on determining a distance between each physical machine and each remaining physical machine in the set of physical machines, the physical machine, wherein the physical machine that has been selected is a closest physical machine to a set of physical machines that satisfy the first set of migration constraints.

14. A computer program product for managing virtual machine migration, wherein the computer program product comprises:

a storage device readable by a processing circuit and storing instructions for execution by the processing circuit for performing a method comprising:

selecting a virtual machine from a set of virtual machines;

analyzing each physical machine in a plurality of physical machines with respect to a first set of migration constraints associated with the virtual machine that has been selected;

identifying a set of physical machines in the plurality of physical machines that satisfy the first set of migration constraints;

determining a migration impact factor for each physical machine in the set of physical machines that has been identified based on a second set of migration constraints associated with the virtual machine that has been selected; and selecting, in response to determining the migration impact factor, a physical machine from the set of physical machines with at least a lowest migration impact factor on which to migrate the virtual machine that has been selected.

15. The computer program product of claim 14, wherein the first set of migration constraints are server constraints, and wherein the second set of migration constraints are network constraints.

16. The computer program product of claim 14, wherein selecting the virtual machine further comprises:

identifying a plurality of overloaded virtual machines in a network;

determining, for each overloaded virtual machine in the plurality of overloaded virtual machines, a total amount of incoming communication traffic;

sorting the plurality of overloaded virtual machines in descending order of their total amount of incoming communication traffic; and selecting, based on the sorting, the overloaded virtual machine that comprises a highest total amount of incoming communication traffic.

17. The computer program product of claim 14, wherein the identifying a set of physical machines further comprises:

identifying, based on the first set of migration constraints, a set of physical machines that comprises a number of available physical machine resources that satisfy the first set of migration constraints.

18. The computer program product of claim 14, wherein determining a migration impact factor further comprises:

determining a total amount of incoming communication traffic between the virtual machine that has been selected and a set of dependent virtual machines associated with the virtual machine; and determining a distance between the each physical machine and each remaining physical machine in the set of physical machines.

19. The computer program product of claim 18, wherein selecting a physical machine from the set of physical machines with at least a lowest migration impact factor further comprises:

selecting, based on determining the total amount of incoming communication traffic between the virtual machine that has been selected and the set of dependent virtual machines, the physical machine, wherein the physical machine that has been selected is a closest physical machine to a set of physical machines on which the set of dependent virtual machines are to be migrated to.

20. The computer program product of claim 18, wherein selecting a physical machine from the set of physical machines with at least a lowest migration impact factor further comprises:

selecting, based on determining a distance between each physical machine and each remaining physical machine in the set of physical machines, the physical machine, wherein the physical machine that has been selected is a closest physical machine to a set of physical machines that that satisfy the first set of migration constraints.

* * * * *